Sept. 22, 1959 J. A. GLOVER 2,904,951
THREE SIZE YARD BROOM
Filed May 22, 1957
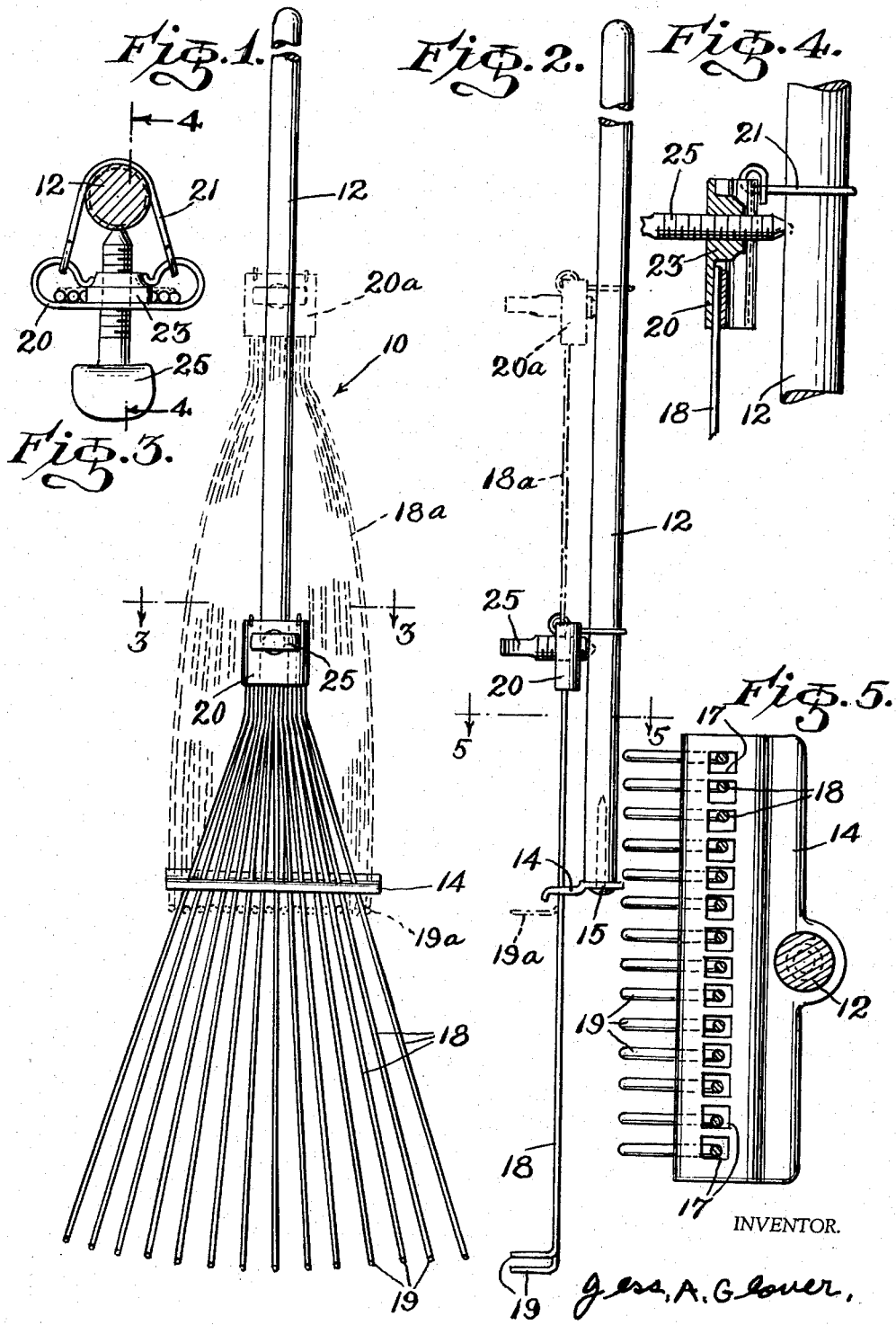
INVENTOR.
Jess A. Glover

United States Patent Office 2,904,951
Patented Sept. 22, 1959

2,904,951

THREE SIZE YARD BROOM

Jess A. Glover, Vilonia, Ark.

Application May 22, 1957, Serial No. 660,829

1 Claim. (Cl. 56—400.18)

This invention relates to garden and yard hand tools and more particularly to an adjustable yard broom.

It is an object of the present invention to provide a yard broom having means for adjusting the longitudinal length thereof and the lateral width of the broom member, whereby the broom may be adjusted for use for any desired purpose in and around a yard or garden.

It is another object of the present invention to provide an adjustable broom of the above type wherein one end of the wire elements are secured to an adjustable sleeve, whereby the movement of the sleeve relative to the end of the broom handle is effective to adjust the length of the entire broom and the lateral width of the broom members, whereby the size of the broom can be substantially reduced for shipping and storage purposes.

Other objects of the invention are to provide an adjustable yard broom bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a front elevational view of a yard broom made in accordance with the present invention;

Figure 2 is a side elevational view of the broom shown in Figure 1;

Figure 3 is an enlarged transverse cross sectional view taken along line 3—3 of Figure 1;

Figure 4 is a cross sectional view taken along line 4—4 of Figure 3; and

Figure 5 is a transverse cross sectional view taken along line 5—5 of Figure 2.

Referring now more in detail to the drawing, an adjustable yard broom 10 made in accordance with the present invention is shown to include an elongated circular handle 12. A transversely extending guide bracket 14 is secured, such as by a nail 15, to the lower end of the handle 12. As is more clearly shown in Figure 5, this guide bracket 14 is provided with a plurality of similarly shaped laterally spaced openings 17 which are adapted to slidably receive the shanks of resilient tines 18 which are exceptionally convenient for raking leaves and other types of debris commonly found in gardens and yards. The outer free ends of the tines 18 are provided with angularly related bent teeth 19, while the upper ends of the shanks are integrally secured within a sleeve member 20.

As is more clearly shown in Figure 3, the sleeve 20 is supported for longitudinal movement upon the handle 12 by a bail 21. This sleeve is also provided with a threaded bushing 23 which threadingly receives a wing nut 25 for adjusted locking engagement with the handle 12 so as to maintain the sleeve 20 in any desired longitudinal position relative to the handle 12.

The operation of the broom 10 will now become apparent. In the intermediate position shown in Figures 1 and 2, the lateral spread of the free ends of the tines is approximately twelve inches. By loosening the wing nut 25 the sleeve may be moved in either longitudinal direction relative to the handle 12 to adjust the width of the tines. By moving the sleeve upwardly to the uppermost position 20a, the free ends of the tines are drawn together through the combined action of the guide plate 14 so that they are drawn together to a width of approximately seven inches. It will be noted that the shanks of the tines 18a are practically completely withdrawn, while only the projecting bent teeth 19a remain for useful work. A broom of this type is particularly useful when working around shrubs and flowers and conjested areas. By moving the sleeve 20 to the completely extended position (not shown), the free ends of the tines can be spread apart to a distance of approximately twenty-four inches, so as to provide a broom with a very wide spread for raking large quantities of leaves and the like. Of course, the sleeve 20 may be secured in any desired position intermediate both extreme positions so that it may be adapted for substantially any desired purpose. It will be noted that through the combined action of the sleeve 20 and the guide plate 14, that the lateral spread of the tines will increase as the sleeve 20 is moved closer toward the bottom end of the handle 12. Furthermore, through the combined action of the sleeve 20 and the guide plate 14, a very sturdy and useful tool is provided.

While various changes may be made in the detail construction, it shall be understood that such changes shall be within the spirit and scope of the present invention as defined by the appended claim.

What I claim as new and desire to protect by Letters Patent of the United States is:

An adjustable broom comprising, in combination, a handle, guide means secured to one end of said handle, a sleeve slidably supported upon said handle for movement relative to said one end, a plurality of individual tines secured at one end to said sleeve in slidable guided relationship with said guide means, adjustable lock means securing said sleeve and said tines in an adjusted longitudinal position relative to said one end of said handle, said guide means comprising a laterally extending plate having a plurality of aligned and laterally spaced openings, a separate one of said tines being slidably received within each one said openings, said adjustable lock means comprising an internally threaded stud secured to said sleeve, a wing nut threadingly received within said stud movable into engagement with said handle, said sleeve comprising a plate integrally securing the ends of said tines together, and a bail secured to said plate slidably receiving said handle therethrough.

References Cited in the file of this patent

UNITED STATES PATENTS

| 1,200,160 | Bonnett | Oct. 3, 1916 |
| 2,072,992 | Potemkin | Mar. 9, 1937 |
| 2,149,429 | Finkes | Mar. 7, 1939 |

FOREIGN PATENTS

| 599,984 | Great Britain | Mar. 25, 1948 |